Jan. 3, 1956
L. E. HITE
2,729,238
VALVE MOUNTING
Filed March 20, 1953
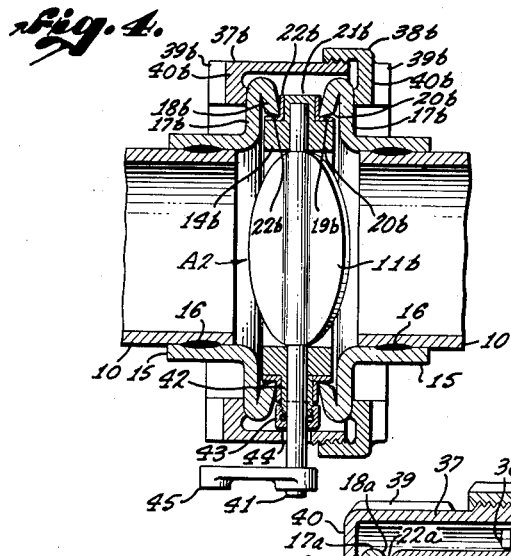
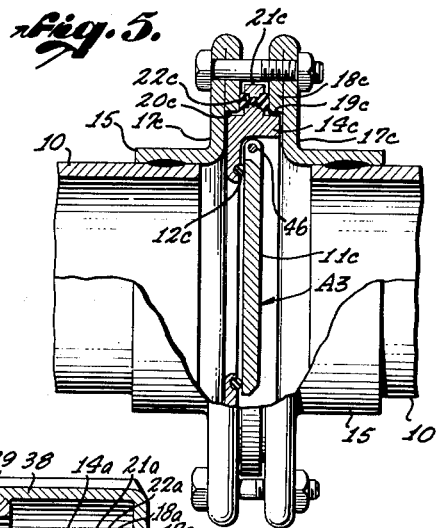
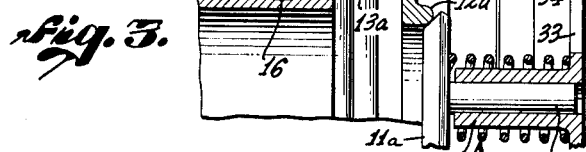
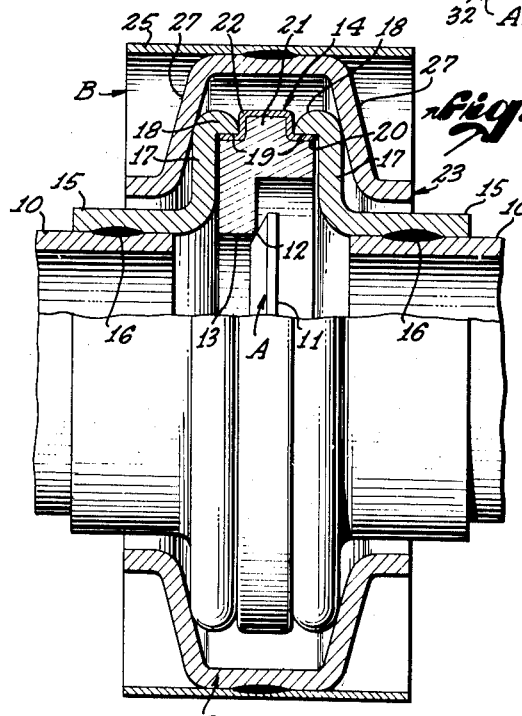
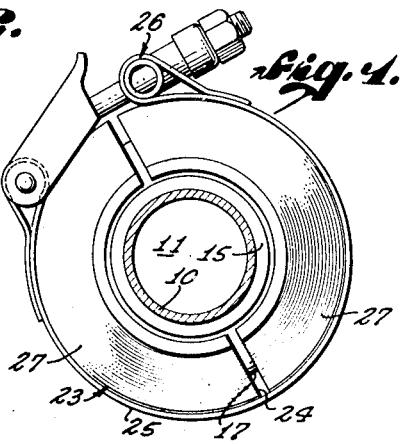
LESTER E. HITE,
INVENTOR.
ATTORNEY.

United States Patent Office 2,729,238
Patented Jan. 3, 1956

2,729,238

VALVE MOUNTING

Lester E. Hite, Los Angeles, Calif., assignor to Marman Products Company, Inc., Los Angeles, Calif., a corporation of California Application March 20, 1953, Serial No. 343,683

11 Claims. (Cl. 137—515.7)

This invention relates to valve assemblies and has as its primary object to provide a valve assembly for insertion in a fluid line, said valve assembly being such as to utilize the fluid line itself as a valve casing, thereby eliminating the conventional valve casing which usually is a casting of less tensile strength than the tubing of the fluid line (or, to gain strength, it is often quite bulky and heavy and objectionable for that reason, especially in aircraft installations where weight saving and security against failure are extremely essential considerations). To attain weight saving and low cost coupled with avoidance of failure of a valve casing is a major object of the invention.

The invention contemplates a valve assembly including a valve unit adapted to be inserted between adjoining ends of tube sections in a fluid line, said valve unit including an annular member adapted to function both as a valve seat and as a seal between the tube sections.

A further object is to provide an improved arrangement of tube flanges having peripheral, infolded lips defining an annular pocket for receiving and piloting the valve unit, together with means for drawing the flanges into sealing engagement with the valve unit.

Other objects will become apparent in the ensuing specifications and appended drawings in which:

Fig. 1 is an end view of a combined valve unit and tube coupling embodying the invention;

Fig. 2 is a view thereof partly in side elevation and partly in axial section;

Fig. 3 is a fragmentary axial sectional view of a combined coupling and valve unit embodying a modified form of the invention;

Fig. 4 is an axial sectional view of a combined coupling and valve unit embodying another modified form of the invention; and Fig. 5 is a view partially in side elevation and partially in axial section of a combined valve unit and coupling embodying another modified form of the invention.

Preferred form of invention—Fig. 2

Referring now to the drawings in detail, I have shown in Figs. 1 and 2, as an example of a preferred form in which the invention may be embodied, a combined valve unit and coupling in a joint between tube sections 10, 10 said combined valve unit and coupling including a valve assembly, indicated generally at A, and a coupling assembly indicated generally at B.

The valve assembly A may comprise any type of movable valve element 11 arranged to engage a valve seat 12 for closing a port defined within the valve seat 12. Valve seat 12 constitutes a portion of an annular member 13 which in turn forms a cylindrical body portion of an annular seal 14 of the coupling assembly B.

Coupling assembly B includes, in addition to the annular seal 14, a pair of flange units each having a collar portion 15 secured, as by welding at 16 to a respective tube section 10 and each including a flange 17 extending radially outwardly from the end of the respective tube section 10. Flanges 17 are provided with axially extending lips 18 each defining an inwardly facing shoulder 19. An annular recess 20 is defined between the shoulders 19 and the inner faces of flanges 17 which extend radially inwardly from shoulders 19. In this form of the invention, in the cross-section of flange 17, the shoulder 19 is substantially a diameter of the semi-circular cross-section of the periphery of flange 17, whereby a fairly sharp edge is defined at the intersection of shoulder 19 and the rounded peripheral surface. In this connection, it may be noted that lip 18 is formed by infolding the peripheral portion of flange 17, then trimming the infolded portion to define the shoulder 19. The lips 18 may be considered to be of substantially quandrant (a quarter segment of a circle) shaped in cross-section. Seal 14 is of T-section, including the cylindrical body portion 13 and an annular, radially outwardly projecting rim portion 21. The cylindrical body 13 of the combined seal and valve seat, is received within annular recess 20, and the respective end portions of body 13 are piloted within annular shoulders 19 with a sufficiently close fit to maintain the seal and valve unit in concentric relation to tube sections 10. The radially projecting rim portion 21 of seal 14 is engaged between the edges of lips 18, which edges are preferably of sufficient sharpness to be capable of, when subjected to axial pressures, being embedded in the relatively soft metal facing 22 with which the seal 14 is coated. The facing 22 may be of copper or other relatively soft, corrosion resistant metal, whereas the body of the seal 14 is of a harder, more rigid metal.

For exerting axial pressure against the flanges 17, in order to establish sealing engagement of lips 18 with coating 22, I provide a V-band 23 in two semi-circular sections (Fig. 1), with ends separated by gaps 24, together with a constrictor band 25 of flexible ribbon metal, and a take-up connector unit 26, for drawing the ends of band 25 together. V-band sections 23 are each of V-section, with radially inwardly diverging lateral wall portions 27 adapted, when drawn radially inwardly, to exert a wedging action against the flanges 17.

Valve seat ring 13 is embraced between flanges 17 and thereby securely restrained against axial displacement. Being fitted within the recess 20, it is thereby supported and accurately centered with reference to the axis of the fluid line.

By providing the valve seat ring as a part separate from the seal 14, it becomes possible to optionally insert the valve unit or to omit it from a given coupling, as occasion may require. In either event, the tube sections are securely joined and sealed, fluid tight, by the coupling mechanism B.

Modified form—Fig. 3

Fig. 3 illustrates how the valve unit A1 may be embodied in a coupling comprising a seal 14a of sleeve form having at its respective ends, radially inwardly projecting flanges 21a embraced between flanges 17a that are attached to respective tube sections 10. By way of illustration of one type of valve unit that may be embodied in the invention, valve unit A1 is illustrated as being of the spring pressed poppet type of check valve, including a poppet 11a having a stem 31 slidably mounted in a bearing 32 constituting the hub portion of a spider 33 which is mounted within seal 14a in a suitable manner, as by having an annular rim flange 34 welded to the inner wall thereof. To facilitate assembly of the valve supporting spider 33 and the valve seat member 12a within seal 14a, the latter may be constructed in two separable sections, sealed by a gasket 35 and joined by fastening elements such as bolts 36, extending through radial flanges on the respective sections.

Fig. 3 also illustrates how the invention may utilize a modified form of coupling means comprising, in this instance, a pair of coupling collars 37, 38 having a threaded connection as shown, having suitable wrench-engaging means 39, having radially inwardly projecting end flanges 40, engageable against respective tube flanges 17, and adapted to be rotated, one relative to the other, for drawing the respective collars toward each other and thereby exerting axial pressure, through flanges 40, 40 against flanges 17a, 17a to clamp the seal 14a therebetween.

The lips 18a of flanges 17a are folded flatly against the inner side walls of flanges 17a. As in the preferred form of the invention, the inner margins of lips 18a define shoulders 19a which are spaced radially outwardly from the inner extremities of the flanges 17a so as to define, with the exposed, radially inward portions of the inner walls of flanges 17a, annular pockets 20a in which are piloted the cylindrical end portions 13a of the seal 14a.

Fluid sealing is effected by pressure engagement of lips 18a against relatively soft facings 22a on the outer faces of the radial portions 21a of seal 14a.

Fig. 4 illustrates how the invention may utilize a modified form of valve unit, here indicated at A2, which may be of the butterfly type, including a valve disc 11b mounted on a shaft 41. The radial rim portion 21b of the seal 14b, in this arrangement, is sufficiently thick, axially, to provide bearings in which the respective end portions of shaft 41 are journalled. At one side, seal 14b is provided with a boss 42 constituting an integral radial extension of rim portion 21b at that point, and cooperating with a cap 43 which is threaded thereon to form therewith a packing gland through which extends one end portion of shaft 41, fluid sealed with respect to the interior of the fluid line.

Shaft 41 may be extended loosely through an opening or slot 44 in collar member 37b, so that its outer end may be provided with a crank arm 45 for actuating the valve A2. This will require that the collar member 37b remain in substantially non-rotatable relation to the seal 14b, but this is not objectionable since collar member 38b is free to rotate relative to the remainder of the assembly in order to tighten the coupling.

Fig. 4 also illustrates a somewhat modified form of sealing joint, wherein the soft metal facings 22b of seal 14b (on the peripheral faces of the cylindrical body portion 20b of the seal and on the side faces of the radial rim portion 21b respectively) define annular crotches in which the lips 18b of tubular flanges 17b are seated. In this instance, lips 18b may be in the form of extremities of flanges 17b which are folded inwardly to a degree where they define a small angle (e. g. within the range from 5° to 20°), with reference to the main radial portions of flanges 17b. Also, the inner margins of infolded lips 18b may be beveled (as by machining) so as to be frustro-conical and to diverge from the cylindrical peripheral surfaces of facings 22b in a direction away from the median plane of seal 14b, as indicated above. Similarly, the opposed inner faces of lips 18b are frustro-conical and are arranged in outwardly diverging relation to the radial sides of facings 22b. It will now be apparent that these frustro-conical inner margins and opposed faces of lips 18b will define knife edges for engagement in the crotches of facings 22b, adapted to be embedded in the facings 22b as the result of axial pressure applied to flanges 17b by coupling collars 37b, 38b. Because of their conical form, lips 18b, under the axial compression, will tend to deform with a flattening action having a Belleville washer deflection characteristic, such that the knife edges of the lips will be contracted radially inwardly as they are pressed axially against the facings 22b, and the result will be an embedding of the lips in the facings with an improved sealing effect.

As in Fig. 3, this form of the invention utilizes a coupling means comprising a pair of threaded collar members 37b, and 38b respectively having a threaded connection, as shown, and having wrenching means 39b (slots or lugs), whereby the two collar members may be rotated relative to each other, with their radial flanges 40b thereby exerting axial pressure against the flanges 17b of the tube sections 10.

As in the other forms of the invention, the inner marginal faces 19b of lips 18b are spaced radially outwardly from the tube sections 10 to define annular pockets 20b in which are piloted the respective end portions of the cylindrical body 13b of the combined seal and valve seat member 14b.

Fig. 5 illustrates how the invention may utilize a valve unit (here indicated at A3) which is of the swinging or flapper valve type, embodying a swinging valve disc 11c hinged at 46 to the annular seal 14c and engageable against the valve seat 12c forming part of seal 14c. Lips 18c of tube flanges 17c are in this instance shown as being folded flatly against flanges 17c, their inner margins defining shoulders 19c which are offset radially outwardly from the inner extremities of flanges 17c so as to provide an annular pocket 20c defined between the exposed inner faces of flanges 17c and the annular shoulders 19c in which seal 14c is received, with valve seat 12c disposed substantially at the diameter of tube sections 10. As in the other forms of the invention, the combined seal and valve unit A3 is piloted within shoulders 19c. Sealing may be accomplished by the engagement of the flat radial faces of lips 18c against gaskets 22c which may be in the form of two O-rings of compressible material (such as soft rubber, synthetic or natural) seated in annular face grooves in rim portion 21c of seal 14c, with circumferentially spaced webs extending through apertures in rim 21c and integrally joining the two O-rings.

I claim:

1. In a valve assembly for a fluid line comprising tube sections to be coupled end to end in axial alignment: a combined seal and valve unit comprising an annular seal and a valve seat defining a valve opening of a diameter substantially equal to that of the tube sections, and a movable valve element carried by said annular seal; thin, flat flanges extending radially outwardly from the opposed ends of said tube sections, said flanges including peripheral portions projecting axially toward each other and having inner margins defining shoulders which are offset radially outwardly from said tube sections to define, with the opposed inner radial faces of said flanges, an annular recess in which said seal and valve seat are received substantially entirely between said flanges; said seal and flange having cooperable means for establishing a fluid sealing joint between said flanges; and coupling means encircling said flanges and having axially opposed means engageable with the respective flanges for applying thereto axial pressure for urging said flanges and seal into sealing interengagement.

2. A valve assembly as defined in claim 1, wherein said shoulders are disposed adjacent the peripheries of the flanges.

3. A valve assembly as defined in claim 1, wherein said shoulders are disposed adjacent the peripheries of the flanges and said peripheral portions comprise axially projecting lips of quadrant section, with said shoulders intersecting the peripheral surfaces of the lips to define relatively sharp edges for sealing engagement with said seal.

4. A valve assembly as defined in claim 1, wherein said shoulders are disposed adjacent the peripheries of the flanges and said peripheral portions comprise axially projecting lips of quadrant section, with said shoulders intersecting the peripheral surfaces of the lips to define relatively sharp edges, said seal having lateral facings of soft metal in which said lip edges are adapted to be embedded when subjected to axial pressure, thereby to establish a fluid seal.

5. A valve assembly as defined in claim 1, wherein said shoulders are disposed adjacent the peripheries of the flanges and said peripheral portions comprise axially projecting lips of quadrant section, with said shoulders intersecting the peripheral surfaces of the lips to define relatively sharp edges, said seal having lateral facings of soft metal in which said lip edges are adapated to be embedded when subjected to axial pressure, thereby to establish a fluid seal; said coupling means comprising a sectional band of V-channel section having frustro-conical side walls constituting said axially opposed flange engaging means, together with a constricting band encircling said section V-channel band and having means for constricting the same so as to apply radially inwardly directed pressure from said side walls to said flanges, with a wedging engagement resulting in axially directed pressure against said flanges.

6. A valve assembly as defined in claim 1, wherein said seal is of T-section including a cylindrical body the end portions of which are piloted within said shoulders to establish coaxiality of the seal and tube sections, and a radially outwardly projecting rim portion having side facings of a material softer than said lips, in which said lips are adapted to be embedded under said axial pressure.

7. A valve assembly as defined in claim 1, wherein said seal is in the form of a sleeve having at the respective ends thereof, radially inwardly projecting end wall members having at their inner extremities, cylindrical end portions projecting axially outwardly and piloted within said flange shoulders to establish coaxiality of the seal and tube sections, said valve seat being attached to said sleeve, said peripheral flange portions comprising infolded lips which are positioned to engage against said end wall members of the seal to establish the sealing connection between the tube sections.

8. A valve assembly as defined in claim 1, wherein said seal is of T-section including a cylindrical body the end portions of which are piloted within said shoulders to establish coaxiality of the seal and tube sections, and a radially outwardly projecting rim portion, said movable valve element being of the butterfly type, including a valve disc having shaft members projecting diametrically from opposite sides thereof and journalled in said rim portion of the seal, one of said shaft members projecting through said rim portion and having an actuator element at its outer end, said peripheral flange portions being engaged against side faces of said rim portion of the seal.

9. A valve assembly as defined in claim 1, wherein said seal is of T-section including a cylindrical body the end portions of which are piloted within said shoulders to establish coaxiality of the seal and tube sections, and a radially outwardly projecting rim portion, said movable valve element being of the butterfly type, including a valve disc having shaft members projecting diametrically from opposite sides thereof and journalled in said rim portion of the seal, one of said shaft members projecting through said rim portion and having an actuator element at its outer end, said peripheral flange portions comprising infolded lips of frustro-conical shape, converging radially inwardly with reference to said side faces of the seal and having bevelled inner margins diverging axially outwardly with reference to the peripheral faces of said cylindrical body, said side faces and peripheral faces defining crotches and the inner side faces and inner margins of said lips intersecting to define acute edges which are adapted to engage in said crotches, said seal having a facing of metal softer than said lips, which facing defines said side faces and peripheral faces and is adapted to be penetrated by said lip edges when said axial pressure is applied.

10. A valve assembly as defined in claim 1, wherein said valve element is of the flapper type, and wherein said valve seat and seal are embodied in an integral annulus within the confines of which said valve element is embraced, when closed.

11. A valve assembly as defined in claim 1, wherein said seal is of T-section including a cylindrical body the end portions of which are piloted within said shoulders to establish coaxiality of the seal and tube sections, and a radially outwardly projecting rim portion having side faces engaged by said peripheral flange portions, and wherein said valve seat comprises an annular part integral with and projecting radially inwardly from said cylindrical seal body.

References Cited in the file of this patent

UNITED STATES PATENTS

| | | |
|---|---|---|
| 646,902 | Haberle | Apr. 3, 1900 |
| 2,225,838 | Miller | Dec. 24, 1940 |
| 2,301,976 | Schellens | Nov. 17, 1942 |

FOREIGN PATENTS

| | | |
|---|---|---|
| 142,554 | Great Britain | May 6, 1920 |